United States Patent Office 2,834,708
Patented May 13, 1958

2,834,708

DIPHENYLACETALDEHYDES

Edward F. Riener, Haddonfield, N. J., assignor to Rohm & Haas Company, Philadelphia, Pa., a corporation of Delaware No Drawing. Application December 27, 1954
Serial No. 477,937

8 Claims. (Cl. 167—30)

This invention deals with diphenylacetaldehydes and concerns a method for their preparation.

According to the literature when 1,2-bis(chlorophenyl)-1,2-ethanediol is heated with aqueous 35% sulfuric acid in a sealed glass tube at 150°–160° C., a compound, 4,4'-dichlorodiphenylacetaldehyde, is asserted without proof to be formed and to be a solid melting at 149° C. I have prepared 4,4'-dichlorodiphenylacetaldehyde by other methods, established its structure, and found it to be a liquid. A related compound, diphenylacetaldehyde, distilling at 188°–188.5° C./24 mm., has been prepared by heating hydrobenzoin with oxalic acid. I have found a simpler and more practical method for making diphenylacetaldehydes of proved structure.

My method comprises reacting an aqueous strong inorganic acid and a cyclic acetal of the structure.

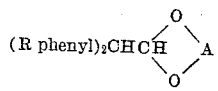

where R is hydrogen, fluorine, chlorine, or bromine, and A is an alkylene group containing not over 12 carbon atoms having two to three carbon atoms between the indicated ether oxygen atoms.

These cyclic acetals are new compounds which are claimed in application Serial No. 477,938, filed on even date in the names of Edward F. Riener, W. E. Craig, and Thomas J. Durkin. They are prepared by reacting together a 2,2-diphenylvinyl halide, an alkaline reagent, and a glycol having two to three carbon atoms between hydroxyl groups.

As typical diphenylvinyl halides there are used for reaction with a 1,2- or 1,3-glycol, 2,2-diphenylvinyl chloride or bromide, 2,2-bis(4-chlorophenyl)vinyl chloride or bromide, 2,2-bis(2-chlorophenyl)vinyl chloride, 2,2-bis (methylchlorophenyl)-vinyl chloride, 2,2-bis(bromophenyl)vinyl chloride, 2,2-bis(fluorophenyl)vinyl chloride, or 2,2-bis(dichlorophenyl)vinyl chloride. These compounds have the general structure (R phenyl)$_2$C=CHX where X is chlorine or bromine and R is as defined above.

Typical glycols which are reacted with the diphenylvinyl halides together with an alkaline reagent include the following: ethylene glycol, propylene glycol, trimethylene glycol, 1,2-, 2,3-, or 1,3-butylene glycol, 1,2-hexanediol, 1,3-hexanediol, 2-ethyl-1,3-hexanediol, 1,2-octanediol, 2-butyl-1,3-octanediol, 2,4-octanediol, phenylethylene glycol, α-methyl glyceryl ether, α-phenyl glyceryl ether, or α-octyl glyceryl ether.

As alkaline agents there may be used sodium or potassium bicarbonate, carbonate, cyanide, or silicate or mixtures at 150°–250° C., or potassium or sodium hydroxide between 150° and 220° C.

In a typical preparation of a diphenylvinylhalide there are mixed 230 parts of 1,1-bis(4-chlorophenyl)-2,2-dichloroethane and 134 parts of tert-butyl alcohol with stirring and heating. Thereto is slowly added aqueous 50% sodium hydroxide solution in an amount of 80 parts. The resulting reaction mixture is stirred and heated under reflux for four hours. It is then stirred with 120 parts of water. Layers form and are separated. The organic layer is heated under reduced pressure to drive off volatile materials. The residue is taken up in 190 parts of methanol and 45 parts of acetone. The resulting solution is chilled below 5° F. with formation of a solid which is filtered off and dried at 40°–50° C. The yield is 150 parts of 2,2-bis(chlorophenyl)vinyl chloride. By the same procedure other diphenylvinyl halides can be prepared having such phenyl substituents as fluorine, chlorine, or bromine. To form the acetals a diphenylvinyl halide, an alkaline reagent, and a 1,2- or 1,3-glycol are mixed and the mixture is heated at a reacting temperature between 150° and 250° C. The product is conveniently separated by taking up the reaction mixture in water and extracting the product. The product may be used as a residue or purified by distillation.

Typical preparations of cyclic acetals follow.

Example A

There are mixed 64 parts of 1,1-bis(4-chlorophenyl)-2,2-dichloroethane, 69 parts of potassium carbonate, and 111 parts of ethylene glycol. This mixture is stirred and heated at 190°–198° C. for 16 hours. The reaction mixture is poured into ice water and the resulting mixture is well stirred. Crystalline material separates and is removed and crystallized from methanol as a white solid, melting at 93°–94° C. By analysis it contains 62.44% of carbon, 4.71% of hydrogen, and 22.93% of chlorine. It thus agrees with the composition of 2-(4,4'-dichlorobenzhydryl) - 1,3 - dioxolane, corresponding theoretical values for which are 62.18%, 4.53%, and 22.93% respectively. The product shows a molecular weight by an ebullioscopic method of 307±3 (theory 309).

In the same way there may be reacted any of the above defined diphenyldichloroethanes, potassium carbonate or other alkaline reagent, and ethylene glycol. In each case there is obtained a product corersponding to the general formula

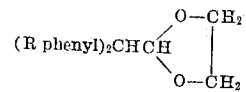

There may be used other glycols than ethylene glycol. For example, propylene glycol reacts to give 4-methyldioxolanes, while 1,2-hexanediol gives 4-butyldioxolanes. Similarly, 1,3-glycols yield 1,3-dioxanes.

Example B

A mixture of 32.0 parts (0.1 mole) of 2,2-bis(4-chlorophenyl)-1,1dichloroethane (M. P. 107°–108° C.), 200 parts of 2,3-butanediol, and 69 parts (0.5 mole) of anhydrous potassium carbonate was stirred and heated. As the temperature approached the reflux temperature (185°–189° C.), volatile material (27 parts) was collected in a side receiver. The reflux temperature was maintained at 185°–189° C. for 17 hours. The reaction mass was then poured into ice water. The oil which separated was extracted with benzene. The benzene solution was washed with water and concentrated on a steam bath under water vacuum. The oil (31 parts) was distilled twice to yield 9.5 parts distilling at 179°–186° C./0.5 mm. It contained by analysis 21.9% of chlorine and corresponded in composition to 2-(4,4'-dichlorobenzhydryl)-4,5-dimethyl-1,3-dioxolane, for which the theoretical chlorine content is 21.0%.

In the same way other cyclic acetals can be prepared with any of the other designated phenyl substituents.

According to the present invention a cyclic acetal of the above structure is heated with an aqueous inorganic acid solution at 75° to 150° C., using pressure, if desired. Heating at reflux is particularly convenient. The acid may be used at a strength from about 5% to about 65%. Such acids as sulfuric, hydrochloric, hydrobromic, hydriodic, or phosphoric, and mixtures thereof are usually most convenient to use. A mixture of hydrochloric or sulfuric acid with acetic is especially effective. The diphenylacetaldehyde formed may be taken up in a volatile water-immiscible inert organic solvent. The solvent is evaporated to leave the desired aldehyde as a residue, which can usually be purified by distillation.

Typical preparations are shown in the following illustrative examples, wherein parts are by weight.

*Example 1*

There are mixed 83.6 parts of 2-(4,4'-dichlorobenzhydryl)dioxolane and 1000 parts of aqueous 20% sulfuric acid solution. The mixture is heated at reflux (101° C.) for about 15 hours. The reaction mixture is cooled to 15° C. and extracted with about 400 parts of benzene. The benzene extract is washed twice with water and concentrated by distilling off the solvent. The residual oil thus obtained is chiefly 2,2-bis(chlorophenyl-acetaldehyde. It is purified by distilling it under reduced pressure, the fraction of 71.5 parts taken at 165°–171° C./0.8 mm. being the desired pure compound.

This compound differs from DDT and related compounds in that it is a miticide and fungicide. The above 2,2-bis(chlorophenyl)acetaldehyde was taken up in kaolin and applied as a 5% dust against the two-spotted mite. It gave a kill of 79% at 24 hours.

A portion of bis(chlorophenyl)acetaldehyde was dissolved in an aromatic naphtha to which was added an oil-soluble emulsifier. This emulsifiable concentrate was extended with water and applied to foliage infested with two-spotted mites. At dilutions of 1:800 and 1:1600 it gave controls of 100%.

Against *Monilinia fructicola* this compound was highly active. In standard fungitoxicity tests it inhibited the germination of spores even at 0.0005%.

*Example 2*

There are mixed 21 parts of 2-(4,4'-dichlorobenzhydryl)-1,3-dioxane, 60 parts of concentrated hydrochloric acid, and 40 parts of acetic acid. The mixture is heated under reflux for 16 hours and then poured into 250 parts of water. The oil that separates is extracted with benzene. The solution is dried over magnesium sulfate and concentrated. The resulting oil is distilled and the fraction distilling at 155°–162° C./0.35 mm. is collected giving 17.5 parts of 2,2-di(4-chlorophenyl)acetaldehyde.

A 2,4-dinitrophenylhydrazone was prepared having a melting point of 174.5°–175° C.

*Example 3*

There are mixed 27 parts of 2-(4,4'-dibromobenzhydryl)-1,3-dioxane, 60 parts of 37% hydrochloric acid, and 40 parts of acetic acid. The mixture is heated under reflux for four hours and poured into 250 parts of ice and water. An oil forms and is extracted with toluene. The toluene solution is separated and concentrated by distilling off solvent, which carries with it any water present, to leave an oily residue which is distilled. The fraction coming over at 190°–205° C./0.5 mm. is 2,2-di(4-bromophenyl)acetaldehyde. When this distillate is cooled, it forms a solid melting at 66.5°–67.5° C.

In place of the above 1,3-dioxane there may be used the analogous 1,3-dioxolane. The same end product is obtained.

In the same way 2-(4,4'-difluorobenzhydryl)-1,3-dioxane or 2-(4,4'-difluorobenzhydryl)-1,3-dioxolane is hydrolyzed with aqueous acid, such as hydrochloric, hydrobromic, or hydriodic acid. The end product in each case is 2,2-di(4-fluorophenyl)acetaldehyde.

*Example 4*

A mixture of 25 parts of 2-benzhydryl-4,5-dimethyl-1,3-dioxolane, 50 parts of 45% hydriodic acid, and 40 parts of acetic acid is heated under reflux for six hours. It is poured into water and the product is extracted with toluene. The organic layer is distilled. The fraction taken at 170°–175° C./15 mm. is diphenylacetaldehyde.

Instead of the above dioxolane there may be used the comparable dioxane. The identical end product is obtained. The same product is also obtained when the dioxolane free of substituents in the 4 or 5 positions is used as a starting material.

The diphenylacetaldehydes exhibit miticidal activity and also fungicidal activity. In tests with two-spotted mites it was found that bis(4-chlorophenyl)acetaldehyde, for example, gave a kill at 24 hours of 100% at a dilution of 1:1600 from an emulsion concentrate extended with water. At 1:3200 dilution the kill was 72%.

The emulsion concentrate was prepared by dissolving 25 parts of bis(chlorophenyl)acetaldehyde in 71 parts of xylene and adding 4 parts of a non-ionic emulsifier, such as an octylphenoxypolyethoxyethanol. In place of xylene there may be used aromatic naphthas, methylated naphthalenes, or other inert organic solvents for the diphenylacetaldehydes.

In place of an emulsion concentrate there may be prepared wettable powders and dusts which utilize as the prime miticidal agent a bis(halophenyl)acetaldehyde. A wettable powder may be prepared by mixing 25 parts by weight of a bis(halophenyl)acetaldehyde with 71 parts by weight of a solid carrier, such as finely particled clay, 3 parts of the sodium salt of a condensed naphthaleneformaldehyde sulfonate, and one part of an octylphenoxypolyethoxyethanol wetting agent. Such wettable powders are readily applied from aqueous sprays in which the powders are extended with water. Similar preparations at lower concentrations of dispersing and wetting agents and of miticidal agent are useful as dusts, in which compositions the bis(halophenyl)acetaldehyde is usually 5% to 10%. The bis(halophenyl)acetaldehydes may be used in conjunction with insecticides and/or fungicides in any of the various types of application.

In standard fungitoxicity tests it was shown that bis(chlorophenyl)acetaldehyde is exceptionally active against *Monilinia fructicola*. Even at a dilution of 0.0005% it provided 100% inhibition against germination of spores of this organism.

The aldehydes also exhibit chemotherapeutant activity and can be used to protect various plants against, for instance, wilts. By way of example bis(chlorophenyl)acetaldehyde was used at 1:8000 to treat tomato plants which were then infected with Fusarium. This agent controlled this wilt.

It follows that the bis(halophenyl)acetaldehydes are useful for application to control mites and fungi on plants by their application thereto.

The diphenylacetaldehydes are also useful as chemical intermediates. They can be reacted with alcohols to give vinyl ethers. In this way of proceeding it is possible to prepare vinyl ethers of the structure

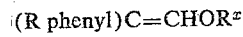
(R phenyl)C=CHOR$^x$ wherein the group R$^x$ contains sensitive or quite reactive groups or atoms, such as $NO_2$, —CN, —Cl, —Br, —$CH_2CCl_3$, —$OCH_2CH_2OCH_2CH_2Br$, —$CH_2CH_2SCN$, or ester or amide linkages. The diphenylacetaldehydes are reduced on nickel or platinum to alcohols which are also good miticides. They react with secondary amines to give enamines, with formaldehyde to give methylol derivatives, with mercaptans, etc.

I claim:
1. A process for preparing diphenylacetaldehydes of the formula

(R phenyl)$_2$CHCHO which comprises heating at a temperature between about 75° and 150° C., a cyclic acetal of the formula

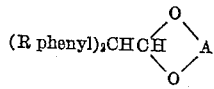

with an aqueous strong inorganic acid, the strength of said acid being between about 5% and about 65%, R being a member of the class consisting of hydrogen, fluorine, chlorine, and bromine and A being an alkylene group of not over 12 carbon atoms having two to three carbon atoms between the oxygen atoms.

2. A process for preparing bis(chlorophenyl)acetaldehyde which comprises heating at a temperature between about 75° and 150° C., a cyclic acetal of the formula

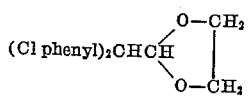

with an aqueous strong inorganic acid, the strength of said acid being between about 5% and about 65%.

3. A process for preparing bis(chlorophenyl)acetaldehyde which comprises heating at a temperature between about 75° and 150° C., 2-(dichlorobenzhydryl)-1,3-dioxane with an aqueous strong inorganic acid, the strength of said acid being between about 5% and about 65%.

4. A process for preparing bis(bromophenyl)acetaldehyde which comprises heating at a temperature between about 75° and 150° C., 2-(dibromobenzhydryl)-1,3-dioxane with an aqueous strong inorganic acid, the strength of said acid being between about 5% and about 65%.

5. A process for preparing bis(bromophenyl)acetaldehyde which comprises heating at a temperature between about 75° and 150° C., 2-(dibromobenzhydryl)-1,3-dioxolane with an aqueous strong inorganic acid, the strength of said acid being between about 5% and about 65%.

6. A process for preparing diphenylacetaldehyde which comprises heating at a temperature between about 75° and 150° C., 2 benzhydryl-1,3-dioxolane with an aqueous strong inorganic acid, the strength of said acid being between about 5% and about 65%.

7. A process for controlling fungi on plants which comprises applying to plants a composition comprising a minor proportion of bis(chlorophenyl)acetaldehyde dispersed in a major proportion of a carrier therefor.

8. A process for controlling fungi on plants which comprises applying to plants a composition comprising a fungicidal amount of bis(chlorophenyl)acetaldehyde dispersed in an inert carrier therefor.

References Cited in the file of this patent
UNITED STATES PATENTS

| | | |
|---|---|---|
| 2,122,813 | Groll et al. | July 5, 1938 |
| 2,430,586 | Ruthruff et al. | Nov. 11, 1947 |

OTHER REFERENCES

Chemical Reviews (Arundale), vol. 51, August 20, 1952 (p. 520).